United States Patent
Shin (10) Patent No.: US 7,933,183 B2
(45) Date of Patent: Apr. 26, 2011

(54) APPARATUS AND METHOD FOR WRITING OPTICAL INFORMATION

(75) Inventor: Kagami Shin, Yokohama (JP)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 172 days.

(21) Appl. No.: 12/434,836

(22) Filed: May 4, 2009

(65) Prior Publication Data

US 2009/0279404 A1    Nov. 12, 2009

(30) Foreign Application Priority Data

May 8, 2008  (JP) ................... 2008-122495
Apr. 29, 2009  (KR) ................... 2009-37595

(51) Int. Cl.
*G11B 7/00* (2006.01)

(52) U.S. Cl. ............. 369/59.11; 369/59.1; 369/53.34; 369/47.5; 369/59.19

(58) Field of Classification Search ............ None
See application file for complete search history.

(56) References Cited

U.S. PATENT DOCUMENTS

| | | | | |
|---|---|---|---|---|
| 6,678,220 B1 * | 1/2004 | Saga | ........................ | 369/44.27 |
| 7,095,696 B2 * | 8/2006 | Nakajima et al. | .......... | 369/59.12 |
| 7,248,552 B2 * | 7/2007 | Furumiya et al. | .......... | 369/53.13 |

FOREIGN PATENT DOCUMENTS

JP     2007-287229     11/2007

* cited by examiner

*Primary Examiner* — Muhammad N Edun
(74) *Attorney, Agent, or Firm* — Myers Bigel Sibley & Sajovec, P.A.

(57) ABSTRACT

An optical disk writing apparatus enhances writing accuracy by writing first data (e.g., test data) that encodes a first writing strategy within first patterns on an optical disk, in response to a first writing signal. A reproducing signal is generated in response to reading the first data from the optical disk. Variations between leading and trailing edges of the first writing signal and leading and trailing edges of the reproducing signal are detected. A correction value is determined using a jitter evaluation function to evaluate the detected variations. From these operations, a second writing strategy is determined using the correction value to modify the first writing strategy. Thereafter, second data (e.g., actual data) is written, which encodes the second writing strategy within second patterns on the optical disk.

12 Claims, 6 Drawing Sheets

| Coefficient Matrix | | | | | | | | | | | | | | | | | | | Constant Column |
|---|---|---|---|---|---|---|---|---|---|---|---|---|---|---|---|---|---|---|---|
| 2739 | 6 | 8 | 5 | 3 | 6 | 5 | 4 | 7 | -400 | -142 | -197 | -188 |  |  |  | -335 |  |  | -262.8 |
| 6 | 2010 | 6 | 3 | 2 | 4 | 3 | 4 | 7 |  |  |  | -243 | -53 | -125 |  | -314 |  |  | -110.7 |
| 8 | 6 | 2335 | 6 | 3 | 5 | 7 | 5 | 9 | -183 |  |  | -273 |  |  |  | -493 | -69 | -147 | -119.0 |
| 5 | 3 | 6 | 2291 | 2 | 5 | 3 | 2 | 5 | -269 | -238 | -196 |  | -90 |  |  |  | -209 |  | -25.9 |
| 3 | 2 | 3 | 2 | 1439 | 3 | 2 | 2 | 3 | -122 |  |  | -49 | -127 | -72 |  |  | -153 | -123 | 48.7 |
| 6 | 4 | 3 | 5 | 3 | 2201 | 7 | 3 | 5 |  | -95 | -238 |  | -166 |  | -82 |  | -309 |  | 77.4 |
| 5 | 3 | 7 | 3 | 2 | 7 | 3368 | 2 | 6 | -156 | -219 | -95 | -219 |  | -72 |  |  |  | -147 | 54.7 |
| 4 | 4 | 5 | 2 | 2 | 3 | 2 | 2475 | 4 |  | -199 | -388 |  | -71 | -191 |  |  |  | -139 | 128.8 |
| 7 | 7 | 9 | 5 | 3 | 5 | 6 | 4 | 3927 |  |  | -68 | -103 |  |  | -157 | -155 | -128 | -463 | 224.0 |
| -400 |  | -183 | -269 | -122 |  | -156 |  |  | 2457 | 4 | 5 | 5 | 3 | 3 | 9 | 6 | 5 | 6 | -234.1 |
| -142 |  |  | -238 |  | -95 | -219 | -199 |  | 4 | 2378 | 4 | 4 | 2 | 2 | 7 | 5 | 5 | 5 | 133.3 |
| -197 |  |  | -196 |  |  | -95 | -388 | -68 | 5 | 4 | 3452 | 4 | 3 | 2 | 9 | 7 | 7 | 6 | 279.4 |
| -188 | -243 | -273 |  | -49 |  | -219 |  | -103 | 5 | 4 | 4 | 1893 | 2 | 3 | 5 | 5 | 3 | 6 | -170.7 |
|  | -53 |  | -90 | -127 | -166 |  | -71 |  | 3 | 2 | 3 | 2 | 1477 | 2 | 3 | 3 | 3 | 4 | 100.4 |
|  | -125 |  |  | -72 |  | -72 | -191 | -157 | 3 | 2 | 2 | 3 | 2 | 2667 | 7 | 4 | 4 | 4 | 166.4 |
| -335 | -314 | -493 |  |  | -82 |  |  | -155 | 9 | 7 | 9 | 5 | 3 | 7 | 2583 | 6 | 9 | 9 | -311.3 |
|  |  | -69 | -209 | -153 | -309 |  |  | -128 | 6 | 5 | 7 | 5 | 3 | 4 | 6 | 2122 | 6 | 5 | 63.0 |
|  |  | -147 |  | -123 |  | -147 | -139 | -463 | 6 | 5 | 6 | 6 | 4 | 4 | 9 | 5 | 3738 |  | 74.6 |

APPARATUS AND METHOD FOR WRITING OPTICAL INFORMATION

REFERENCE TO PRIORITY APPLICATION

This application claims priority to Japanese Patent Application No. 2008-122495, filed May 8, 2008, and to Korean Patent Application No. 2009-37595, filed Apr. 29, 2009, the contents of which are hereby incorporated herein by reference.

FIELD OF THE INVENTION

The present invention disclosed herein relates to an apparatus and method for writing optical information.

BACKGROUND

Data are written to read/write from/to an optical disk using a writing waveform prepared using a reference waveform based on a unique writing parameter (hereinafter, also referred to as a writing strategy or WST) of the optical disk, so that writing quality can be maintained. A unique WST of an optical disk is determined through procedures of writing information to the optical disk using a reference writing strategy (reference WST), reproducing the written information to detect a length of a written mark or space, and correcting a writing waveform in a manner such that the difference between the detected length and a theoretical length by the reference WST. That is, a predetermined WST obtained in this way is determined as a unique WST of the optical disk.

Figure 6:
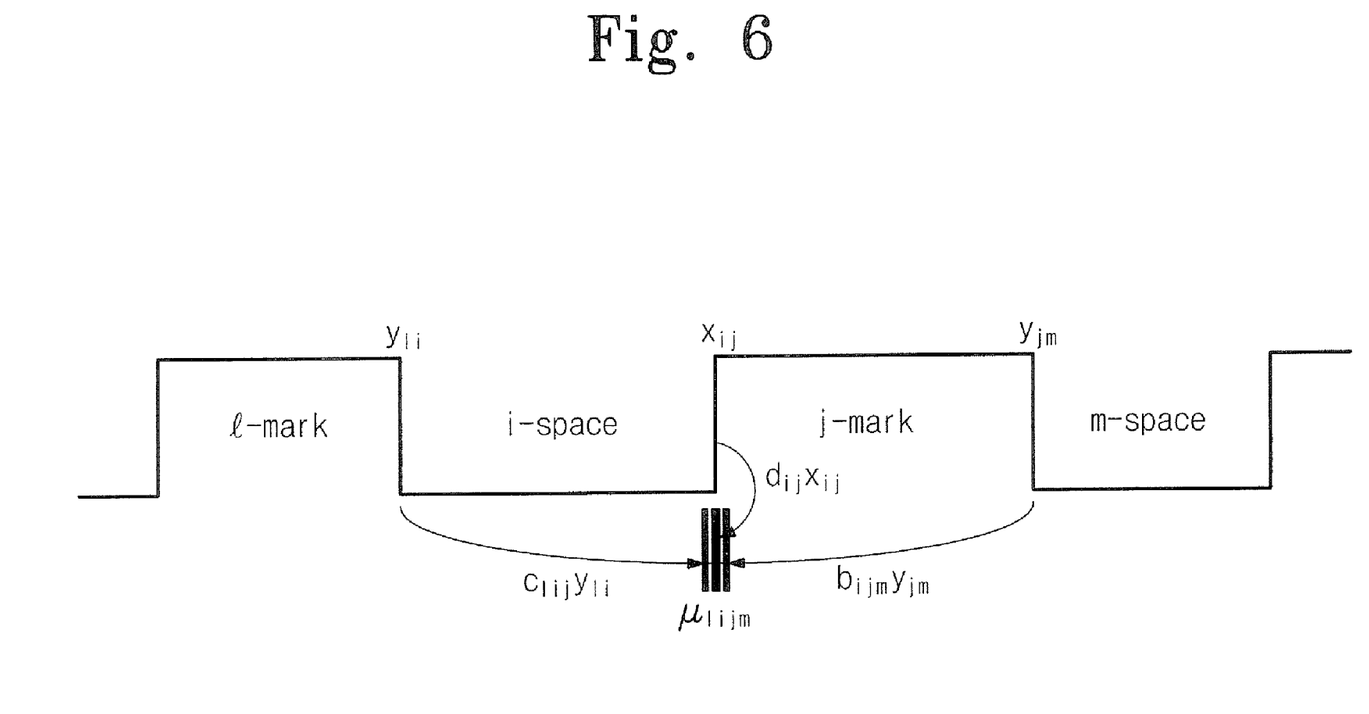
FIG. 6 is a reproducing signal waveform diagram for explaining parameters of a writing strategy according to a typical method.

In a typical method, it is assumed that a leading/trailing edge position of a writing signal generated for a writing test based on a WST is linearly related with a average leading/trailing edge position of a reproducing signal read from a written edge pattern, and the average leading/trailing edge position of the read reproducing signal is set to zero. FIG. 6 is a reproducing signal waveform diagram for explaining parameters of a WST according to a typical method. In FIG. 6, $x_{ij}$, $y_{li}$, and $y_{jm}$ denote variations of leading/trailing edge positions of an l-mark and a j-mark of a writing signal from currently set positions.

$\mu_{lijm}$ denotes a current average leading edge position of a reproducing signal specified by combinations of an l-mark, an i-space, a j-mark, and an m-space. $d_{ij}$, $c_{lij}$, and $b_{ijm}$ denote influence coefficients indicating the influences of the variations $x_{ij}$, $y_{li}$, and $y_{jm}$ on the average leading edge position of the reproducing signal. $r_{lijm}$ denotes probabilities of combinations of the l-mark, the i-space, the j-mark, and the m-space. Each average leading/trailing edge position of the reproducing signal can be made to be zero by using solutions of an equation: $0 = \sum_{lm} r_{lijm}(\mu_{lijm} + d_{ij}x_{ij} + c_{lij}y_{li} + b_{ijm}y_{jm})$.

In the above-described method, averages of differences between a writing signal and a reproducing signal generated by reading each written pattern are calculated at each leading edge position and each trailing edge position, and each of the averages is set to zero. Therefore, since an adjustable WST is limited to each leading/trailing edge position of a writing signal, the extendibility is lacking, and the writing quality and precision are limited.

In another method disclosed in Japanese Patent Application Laid-Open No. 2007-287229, a system controller 32 writes test data in a test region of an optical disk 10 using various WSTs and evaluates reproducing quality of the test data to select an optimal WST. For this, the system controller 32 calculates an evaluation value Hst for each WST by using the equation: $Hst = AEb^2 + BWe^2 + C(Peb - Pmb)^2$ where Eb denotes an error rate minimum, We denotes a writing power range for obtaining a threshold error rate, Peb denotes a writing power level for obtaining a target value β, and Pmb denotes a writing power level for obtaining a minimal error rate. Then, a WST resulting in a minimal Hst is treated as an optimal WST, which is applied in the same way to jitter.

In the disclosed method, test data are written according to previously prepared WSTs, and the written data are read and measured for selecting best one of the previously prepared WSTs. Therefore, more writing tests are necessary for improving precision. In this case, for determining a WST, a larger writing test region should be provided on an optical disk, and test evaluation time increases.

SUMMARY OF THE INVENTION

The present invention provides an apparatus and method for writing optical information by using writing strategy parameters which are adjustable, extendable, adapted to improve writing quality and precision, determinable by using a smaller region of an optical disk, and rapidly correctable.

Embodiments of the present invention provide apparatuses for writing optical information to an optical recording medium by forming a line of marks and spaces on the recording medium by generating writing pulse light according to a predetermined writing strategy and projecting the writing pulse light onto the optical recording medium, the apparatus including: a reproducing signal generation unit configured to read information from the optical recording medium according to a reference writing strategy and generate a reproducing signal according to the marks and spaces; a clock generation unit configured to generate a clock based on the reproducing signal; a detection unit configured to detect leading/trailing edge timing at leading/trailing edge positions of respective marks of the reproducing signal where the reproducing signal varies in level and corresponding variations of the clock generated by the clock generation unit; a calculation unit configured to calculate an element jitter and an element average position of elements classified according to combinations of lengths of the marks and the spaces based on the variations of the clock; and a correction unit configured to compose an evaluation function based on the element jitter, the element average position, and a writing strategy, and optimally correct the writing strategy using the evaluation function, wherein the correction unit corrects the reference writing strategy by using a writing strategy correction value to obtain the predetermined writing strategy.

In some embodiments, the evaluation function may be composed by adding a square of a function composed based on the element jitter and the writing strategy and a square of a function composed based on the element average position and the writing strategy, and multiplying elements of the added result by element existence probabilities, respectively.

In other embodiments, if the element jitter is invariable with the correction of the writing strategy, the element jitter may not be included in the evaluation function, and the evaluation function may be composed by squaring a function composed based on the element average position and the writing strategy and multiplying elements of the squared result by element existence probabilities, respectively.

In still other embodiments, the elements classified according to combinations of the lengths of the marks and the spaces may be classified according to combinations of at least three lengths of the marks and spaces including sequential lengths.

In even other embodiments, the element jitter and the element average position of the evaluation function may be expressed as a linear function of the writing strategy.

In yet other embodiments, the optimal correction of the writing strategy for obtaining the predetermined writing strategy may be performed by correcting the reference writing strategy using a correction value, which is obtained by differentiating a quantification part of the evaluation function according to the writing strategy with respect to the variations detected by the detection unit at the leading/trailing edge positions of the respective marks of the reproducing signal, and setting the differentiated quantification part of the evaluation function to zero.

In further embodiments, the optimal correction of the writing strategy for obtaining the predetermined writing strategy may be performed by correcting the reference writing strategy using a correction value obtained by differentiating the quantification part of the evaluation function according to the writing strategy with respect to the variations detected by the detection unit at leading/trailing edge positions of the respective marks of the reproducing signal and setting the differentiated quantification part of the evaluation function to zero, and a correction value obtained from a non-quantification part of the evaluation function by using a quasi-measurement method.

In other embodiments of the present invention, there are provided methods for writing optical information to an optical recording medium by forming a line of marks and spaces on the recording medium by generating writing pulse light according to a predetermined writing strategy and projecting the writing pulse light onto the optical recording medium, the methods including: writing information to the optical recording medium according to a reference writing strategy by using a writing unit; reading the information written to the optical recording medium by the writing unit and generating a reproducing signal according to the marks and spaces by using a reproducing signal generation unit; generating a clock based on the reproducing signal by using a clock generation unit; detecting leading/trailing edge timing at leading/trailing edge positions of respective marks of the reproducing signal where the reproducing signal varies in level and corresponding variations of the clock by using a detection unit; calculating an element jitter and an element average position of elements classified according to combinations of lengths of the marks and the spaces based on the variations by using a calculation unit; and composing an evaluation function based on the element jitter, the element average position, and a writing strategy, and optimally correcting the writing strategy using the evaluation function by using a correction unit.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Hereinafter, exemplary embodiments of the present invention will be described in detail with reference to the accompanying drawings.

According to exemplary embodiments of the present invention, an apparatus for writing optical information may determine a predetermined writing strategy (peculiar writing parameters of an optical recording medium) by writing information (or test information) to the optical recording medium using a writing signal generated based on a reference writing strategy, generating a reproducing signal by reading the written information (or test information); detecting variations between leading/trailing edge positions of the writing signal and leading/trailing edge positions of the reproducing signal based on a generated clock; and performing a predetermined calculation based on the variations and a jitter evaluation function so as to determine a correction value for establishing the predetermined writing strategy by correcting the reference writing strategy using the correction value.

For this, an explanation will be given on the relationship among parameters (writing strategy parameters) of an original writing strategy, an element jitter and an element average position of elements classified by combinations of marks and spaces of a reproducing signal generated by reading mark-space patterns written by a plurality of tests, and a function for evaluating jitter of an optical recording medium.

It may be set such that the position of each leading/trailing edge of a writing signal including a plurality of marks and spaces is related with a parameter of a reference writing strategy. In addition, an element jitter and an element average position of elements of leading/trailing edge positions of a reproducing signal are related with parameters of a writing strategy. Furthermore, an evaluation function, which is used to correct the reference writing strategy for obtaining a predetermined writing strategy, may be expressed based on the element jitter, the element average position, and the writing strategy. Therefore, by performing a calculation operation for optimizing the evaluation function, correction values can be obtained for minimizing the characteristic jitter of an optical recording medium, and thus a predetermined writing strategy can be made by using the correction values.

To give more detained explanations on the above-mentioned facts, the evaluation function will now be explained. An element jitter and an element average position of elements included in a reproducing signal generated by reading a plurality of written patterns are expressed as a linear function of a writing strategy. An evaluation function for evaluating jitter of an optical recording medium is composed by adding a square of a function composed based on an element jitter and a writing strategy and a square of a function composed based on an element average position and the writing strategy, and multiplying elements of the added result by element existence probabilities, respectively, as shown below.

$$E = \Sigma r_i (\sigma_i^2 + \mu_i^2)$$

where E: evaluation function, $r_i$: element existence probability, $\sigma_i$: element jitter, and $\mu_i$: element average position.

To minimize jitter, parameters of a writing strategy may satisfy an equation obtained by differentiating the evaluation function by writing strategy parameters with respect to a plurality of variations detected at each leading/trailing edge by a detection unit and setting the differentiated evaluation function to zero. Values obtained by this may be used for correcting parameters of a writing strategy to minimize jitter, and a predetermined writing strategy can be obtained by this correction.

In this optimization, sometimes, an element jitter of an evaluation function may not largely varied by correction of a writing strategy, and thus the element jitter may be assumed to be invariable. In this case, the element jitter can be neglected, and the evaluation function can be composed as shown below by squaring a function composed based on the element average position and the writing strategy and multiplying elements of the squared result by element existence probabilities, respectively, as shown below.

$$E = \Sigma r_i \mu_i^2$$

In this case, since the evaluation function can be simplified, calculation can be simply performed in a short time.

Next, exemplary optimization for minimizing jitter by using a simplified evaluation function will be explained for the case where three leading/trailing edge positions of a writing signal including sequential edge positions are used as writing strategy parameters.

Figure 2:
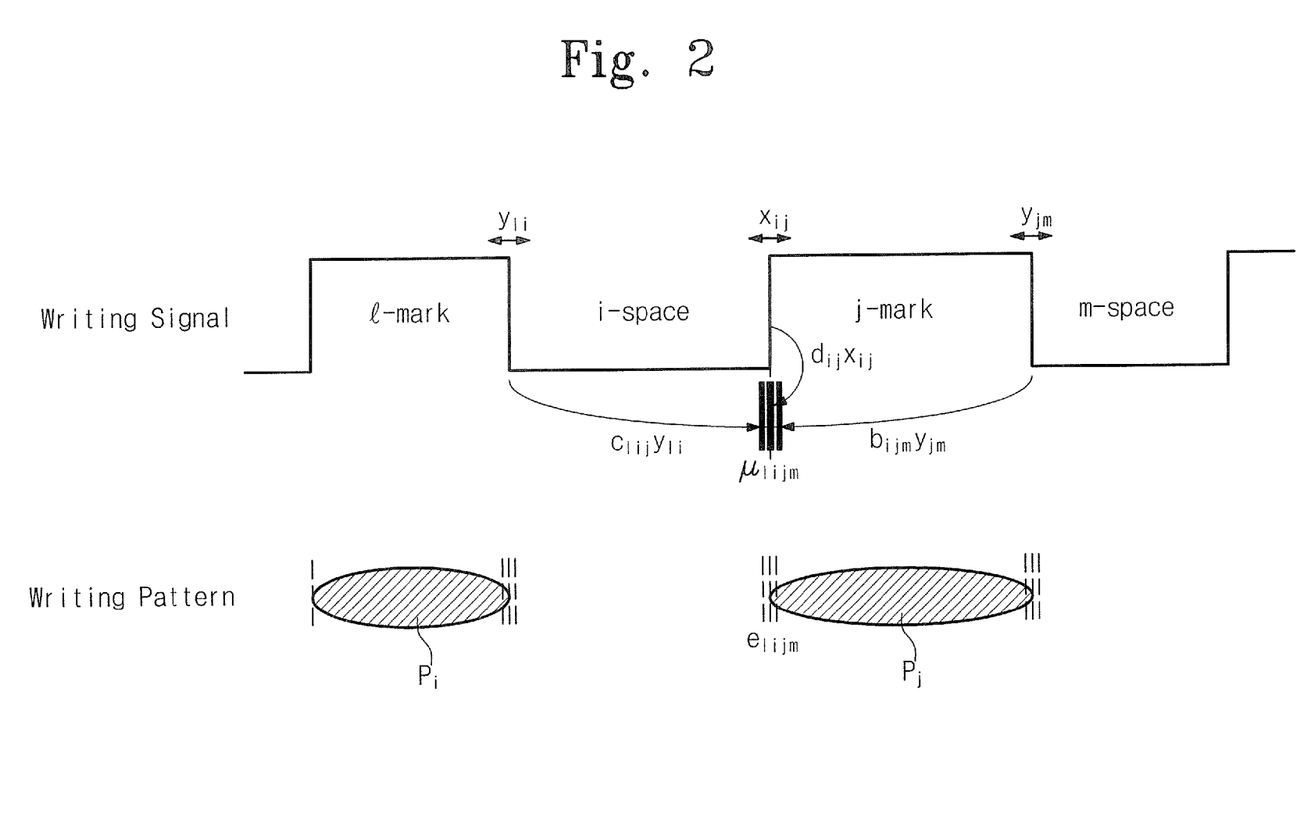
FIG. 2 is a diagram for explaining the relationship between signals and stored patterns in a writing test operation according to an embodiment of the present invention.

FIG. 2 is a view for explaining the relationship between a writing signal and corresponding writing patterns in a writing test operation. Referring to FIG. 2, in accordance with a reference writing strategy, a writing signal may be generated for writing a plurality of marks such as an lT mark, an iT space, a jT mark, and an mT space. Next, writing pulse light is generated according to the writing signal to form writing patterns Pl and Pj on a recording medium. Next, a reproducing signal is generated by reading the written patterns Pl and Pj. Here, the reproducing signal is generalized to explain arbitrary marks and spaces and is expressed by an l-mark and a j-mark indicating marks and an i-space and an m-space indicating spaces.

A current average leading edge position $\mu_{lijm}$ is an average of leading edge positions of a reproducing signal generated by reading leading edge positions $e_{lijm}$ of written patterns Pj specified by combinations of the l-mark, the i-space, the j-mark, and the m-space. $x_{ij}$, $y_{li}$, and $y_{jm}$ denote variations from current set values of a writing signal, which are specified between the l-mark and i-space, the i-space and j-mark, and the j-mark and m-space. Influence coefficients $d_{ij}$, $c_{lij}$ and $b_{ijm}$ indicate the influence of the variations $x_{ij}$, $y_{li}$, and $y_{jm}$ on the average position of the reproducing signal. $r_{lijm}$, denotes an existence probability of a combination of the l-mark, the i-space, the j-mark, and the m-space. The influence coefficients and the existence probability may be obtained by a method such as an experimental method, and for high precision, they may be obtained through several writing tests.

As shown below, an evaluation function can be expressed by the variations $x_{ij}$, $y_{li}$, and $y_{jm}$, which may become three writing strategy parameters.

$$E = \Sigma_{lijm}\{r_{lijm}(\mu_{lijm}+d_{ij}x_{ij}+c_{lij}y_{li}+b_{ijm}y_{jm})^2 + r'_{lijm}(\mu'_{lijm}+ d'_{ij}y_{ij}+c'_{lij}x_{li}+b'_{ijm}x_{jm})^2\}$$

where the symbol (') denotes values about l-space, i-mark, j-space, and m-mark that change in polarity.

Next, for optimization, an optimized method may be used. For this, the following equation may be obtained by differentiating the evaluation function (E) with respect to the variation $x_{ij}$.

$$0 = \Sigma_{lm}(r_{lijm}d_{ij}\mu_{lijm}+r'_{ijlm}c'_{ijl}\mu'_{ijml}+r'_{lmij}b'_{mij}\mu'_{lmij}) + \Sigma_{lm} (r_{lijm}d2_{ij}+r'_{ijlm}c'2_{ij}l+r'_{lmij}b'2m_{ij})x_{ij} + \Sigma_{lm} (r'_{ijlm}c'_{ij}lb'_{jlm}+r'_{lmij}c'_{lmi}b'm_{ij})x_{lm} + \Sigma_{lm}r_{lijm}d_{ij}c_{lij}y_{li}+ \Sigma_{lm}r'_{lmij}d'mib'_{mij}y_{mi}+\Sigma_{lm}r_{lijm}d_{ij}b_{ijm}y_{jm}+ \Sigma_{lm}r'_{ijlm}d'_{jl}c'_{ij}y_{jl}$$

This equation is a linear equation having strategy parameters as variables. In addition, the same result may be obtained by differentiation with reference to the variation $y_{ij}$. In other words, since a linear equation can be obtained with reference to each ij, simultaneous linear equations may be obtained.

Writing strategy parameter correction values can be obtained by solving the simultaneous linear equations by substituting the current average leading edge position value calculated from variations of a reproducing signal of a writing test, and corresponding influent coefficients and existence probabilities.

Figure 3:
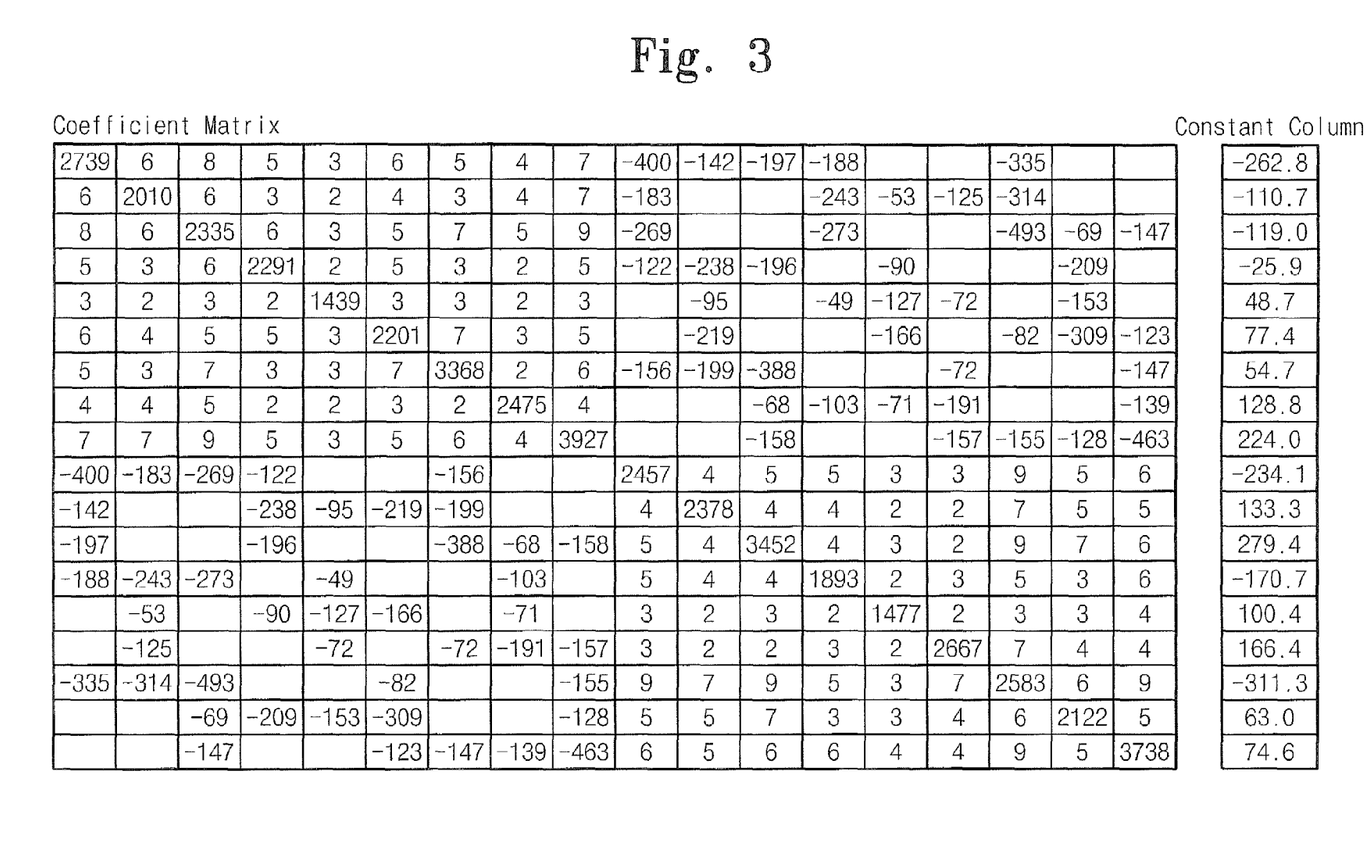
FIG. 3 is an exemplary matrix table obtained by expressing simultaneous linear equations in the form of a matrix according to an embodiment of the present invention.

FIG. 3 is an exemplary matrix table obtained by expressing simultaneous linear equations obtained by substitution values into the simultaneous linear equations in the form of a matrix. Correction values for writing strategy parameters can be obtained by solving the simultaneous linear equations expressed in the form of a matrix equation including a coefficient matrix and a constant column matrix. The simultaneous linear equations may be solved by various methods such as a well-known sweep-out method. Writing pulse light may be generated and irradiated onto a recording medium according to a predetermined writing strategy established through this correction, so as to form a mark-space line on the recording medium with minimal jitter for writing information to the recording medium, thereby improving writing quality and precision.

FIG. 2, an explanation is given on the case where an optical disk 1 (refer to FIG. 1) has a test writing region; however, instead of using a test writing region, a reproducing signal obtained by reading a mark written on a writing region may be used. Writing strategy parameters that can be used for the evaluation function are not limited to a leading/trailing edge of a writing signal.

Figure 4:
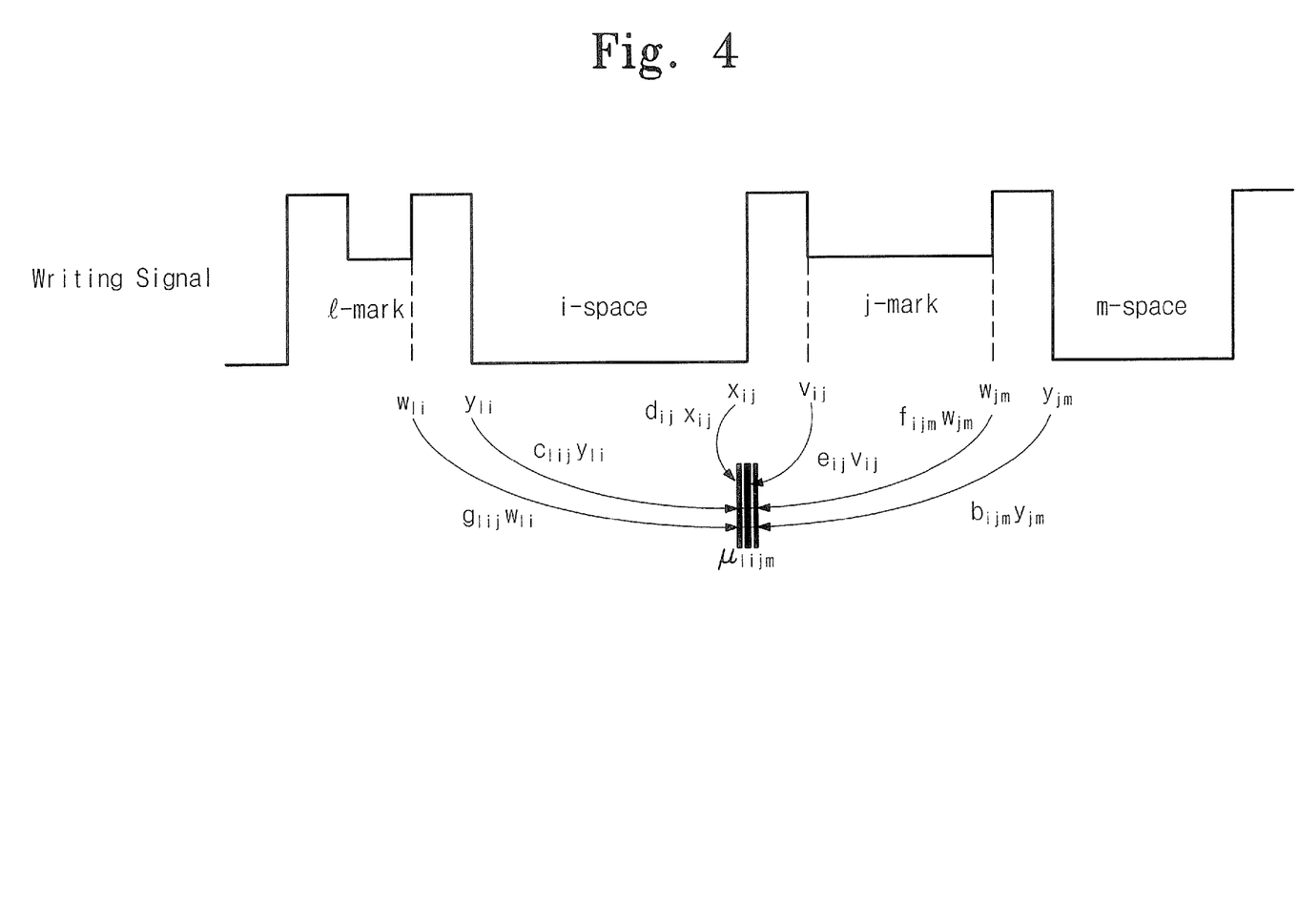
FIG. 4 is a waveform diagram illustrating a reproducing signal having overdrive portions according to an embodiment of the present invention.

FIG. 4 is a waveform diagram illustrating a writing signal having additional overdrive portions. The writing signal is prepared by adding a writing strategy parameter indicating the width of an overdrive portion to the writing strategy parameter of the embodiment 1, so as to form a writing pattern.

$v_{ij}$ denotes a variation from a current setting of a mark leading edge overdrive specified by an i-space and a j-mark; $w_{ij}$ denotes a variation from a current setting of a mark trailing edge overdrive specified by an l-mark and the i-space; and $w_{jm}$ denotes a variation from a current setting of a mark trailing edge overdrive specified by the j-mark and an m-space.

Influence coefficients $e_{ij}$, $g_{lij}$, and $f_{ijm}$ are used to reflect influences of the position variations of the overdrive portions on an average position $\mu_{lijm}$.

Like the case of FIG. 2, an evaluation function can be expressed as follows.

$$E = \Sigma_{lijm}r_{lijm}(\mu_{lijm}+d_{ij}x_{ij}+c_{lij}y_{li}+b_{ijm}y_{jm}+e_{ij}v_{ij}+g_{lij}w_{li}+ f_{ijm}w_{jm})^2 + \Sigma_{lijm}r'_{lijm}(\mu'_{lijm}+d'_{ij}y_{ij}+c'_{lij}x_{li}+b'_{ijm}x_{jm}+ e'_{ij}v_{ij}+g'_{lij}w_{li}+f'_{ijm}w_{jm})^2$$

where the symbol (') denotes all values related with the trailing edge of a j-mark.

By optimizing the above evaluation function like the case of FIG. 2, writing strategy parameters to be corrected can be obtained. By this, a predetermined writing strategy can be obtained for improving writing quality. In addition, parameters of a power axis as well as a time axis can be used as writing strategy parameters. In other words, all writing strategy parameters related with horizontal and vertical axes can be batch-treated for establishing a best writing strategy.

In the case where some writing strategy parameters such as a power level cannot be clearly expressed in the form of an equation, an evaluation equation may include a quantification part (first term) and a non-quantification part (second term) as shown below.

$$E = \Sigma r_i(\sigma_i^2 + \mu_i^2) + \Sigma r_j(\sigma_j^2 + \mu_j^2)$$

In the first term, correction values may be calculated by the method explained in FIG. 2 or 4, and in the second term, correction values may be calculated by a quasi-measurement method such as a well-known gradient method. In this way, although there is a parameter that is a difficult to express numerically, a precise writing strategy can be simply made.

As described above, a writing strategy for minimizing jitter can be obtained by calculating an average leading/trailing position of an element average position and an element jitter leading/trailing edge position from a reproducing signal generated by reading a written mark pattern, or calculating only the average leading/trailing position of the element average position.

As an optimizing method, a simplex method or an interior point method can be used for the case where an equation is linear, and a gradient method, a GA method, or a EDA method can be used for the where an equation is nonlinear. Furthermore, for optimization, a physical restriction condition such as a limit on an edge movement range can be added, or some of mark-space combinations can be united. Moreover, a weight value can be added to an important term of an evaluation function or for stable calculation of the evaluation function, as shown below.

$$E = \Sigma ri(\alpha_i \sigma_i^2 + \beta_i \mu_i^2)$$

where $\alpha_i$ and $\beta_i$ are weight values.

Figure 1:
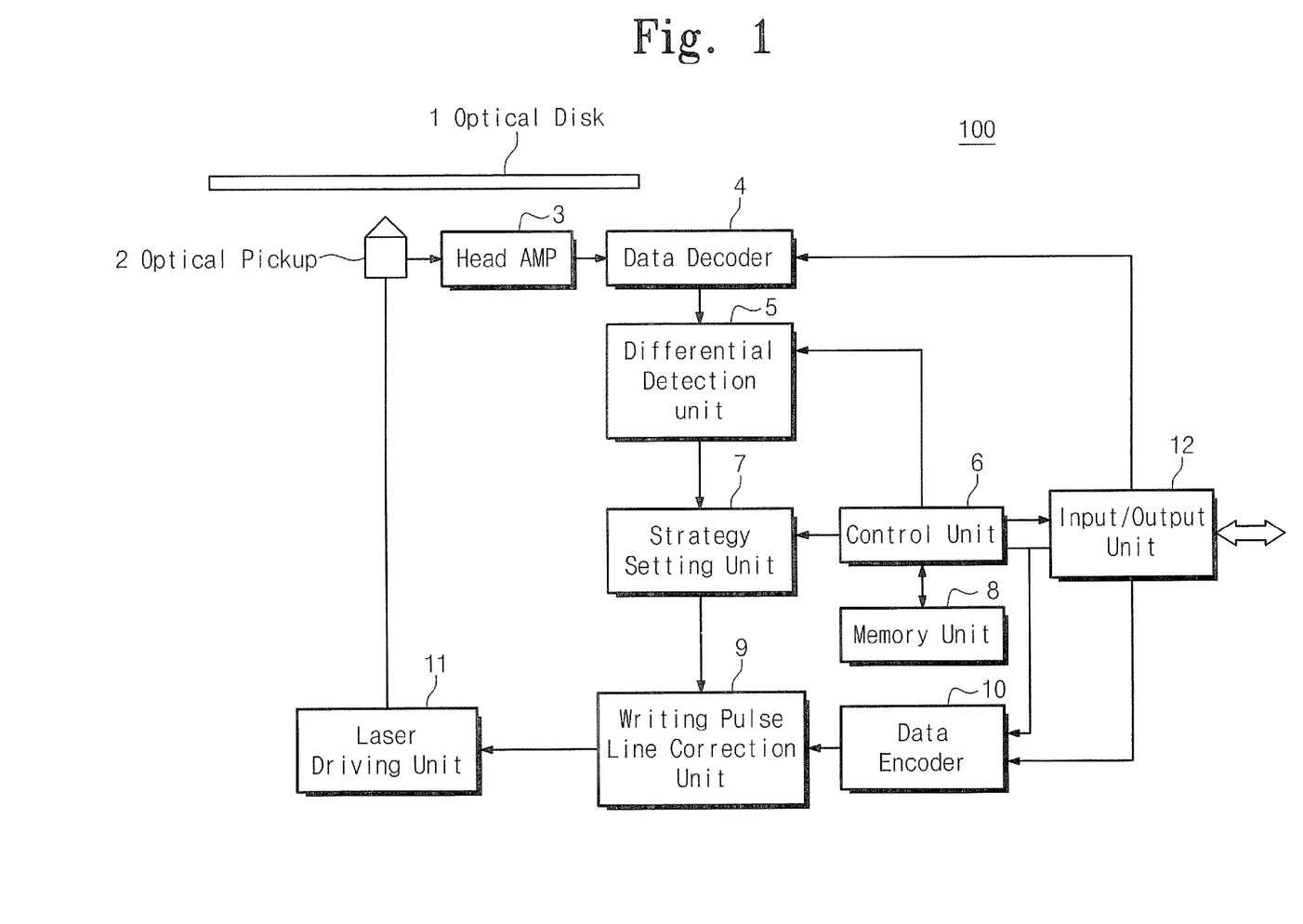
FIG. 1 is a block diagram illustrating an apparatus for writing optical information according to an embodiment of the present invention.

FIG. 1 is a block diagram illustrating an apparatus 100 for writing optical information according to an embodiment of the present invention. Referring to FIG. 1, the optical information writing apparatus 100 may include an optical disk 1, an optical pickup 2, a head amp 3, a data decoder (reproducing signal generation unit, clock generation unit) 4, a differential detection unit (detection unit) 5, a control unit (writing unit) 6, a writing strategy setting unit (correction unit) 7, a memory unit 8, a writing pulse line correction unit 9, a data encoder 10, a laser driving unit 1, and an input/output unit 12.

Figure 5:
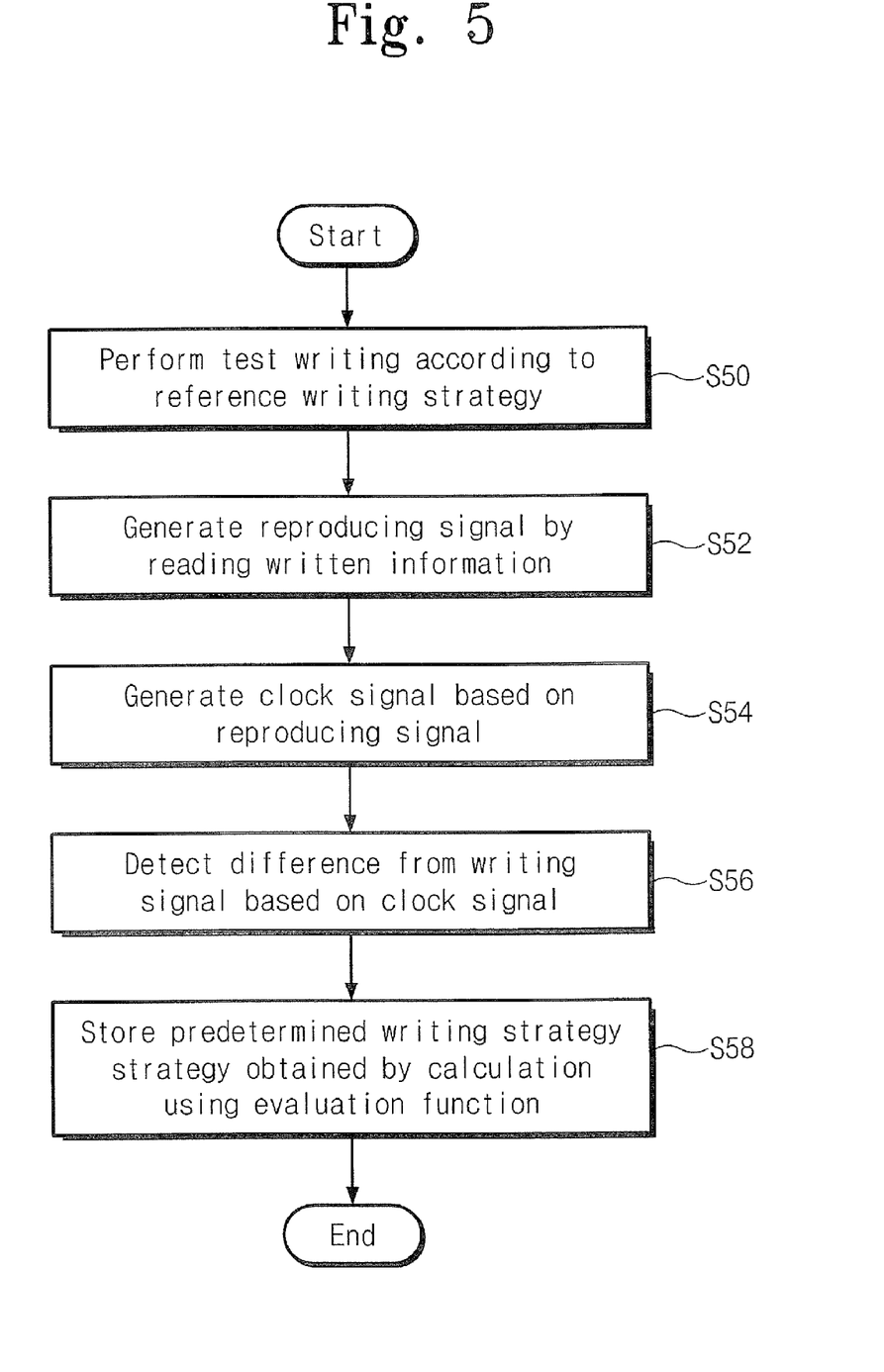
FIG. 5 is a flowchart for explaining procedures of a test writing operation according to an embodiment of the present invention.

FIG. 5 is a flowchart for explaining procedures of a test writing operation according to an embodiment of the present invention. Referring to FIGS. 1 and 5, in a writing strategy correction operation through a writing test, since a leading/trailing edge position of a writing signal is stored in the memory unit 8 as a parameter of a reference writing strategy, the control unit 6 may read the parameter of the reference writing strategy from the memory unit 8 and set the writing pulse line correction unit 9 through the data encoder 10 by using the read parameter. The writing pulse line correction unit 9 may generate a writing pulse line based on the parameter and output the writing pulse line to the laser driving unit 11. The laser driving unit 11 may generate a pulse signal according to the received writing pulse line for driving a laser diode, and the laser driving unit 11 may supply the writing pulse signal to a semiconductor laser (not shown) of the optical pickup 2 so as to generate writing pulse light and form a mark and a space in a test writing region of the optical disk 1 (S50).

After that, the control unit 6 may move the optical pickup 2 to a writing track of the test writing region for reproducing information. A signal read by the optical pickup 2 may be input to the data decoder 4 through the head amp 3. The data decoder 4 may generate a binary signal according to the received signal and may extract a clock signal from the binary signal, and the data decoder 4 may output the binary signal and the clock signal to the differential detection unit 5 (S52, S54). The differential detection unit 5 may detect a differential value (variations) from the binary signal and the clock signal corresponding to each mark such as a 3T, 4T, or 5T mark formed by the control unit 6, and the differential detection unit 5 may the differential value to the writing strategy setting unit 7 (S56).

According to a predetermined order, the writing strategy setting unit 7 may read an evaluation function, which is explained in FIG. 2 or 4, from the memory unit 8 through the control unit 6 and may differentiate the evaluation function, and the writing strategy setting unit 7 may obtain a correction value by substituting the differential value into the differentiated evaluation function and setting the differentiated evaluation function to zero, so as to correct the writing strategy parameter using the obtained correction value and establish a predetermined writing strategy. The predetermined writing strategy may be stored in the memory unit 8 by the control unit 6 (S58).

In a normal writing operation, when writing data are input to the input/output unit 12 from an external device such as a computer, the control unit 6 may transmit the data to the data encoder 10, and the data encoder 10 may encode the data into a writing signal and output the writing signal to the writing pulse line correction unit 9. In addition, the control unit 6 may read a predetermined writing strategy from the memory unit 8 and output the predetermined writing strategy to the writing strategy setting unit 7. The writing strategy setting unit 7 may output a parameter of the predetermined writing strategy to the writing pulse line correction unit 9. The writing pulse line correction unit 9 may correct the leading/trailing edge position of the writing signal based on the parameter of the predetermined writing strategy and output the writing signal to the laser driving unit 11. The laser driving unit 11 may generate a pulse signal for driving a laser diode according to received pulse line of the writing signal and may supply the pulse signal to the semiconductor laser (not shown) of the optical pickup 2 for generating pulse light and writing marks and spaces in a writing region of the optical disk 1 using the pulse light.

In a normal reading operation, the control unit 6 may move the optical pickup 2 to a writing track of the writing region of the optical disk 1 for reproducing information. A signal read by the optical pickup 2 may be input to the data decoder 4 through the head amp 3. The data decoder 4 may decode the received signal into original data and output the data to the input/output unit 12. The input/output unit 12 may output the data to the external device such as a computer under the control of the control unit 6.

Since writing strategy parameters for minimizing jitter can be determined by the above-described method, parameters of the adjustable writing strategy can be variously extended, and writing quality and precision can be improved. In addition, since an optimized writing strategy is logically prepared based on a simple writing operation, a large area of an optical disk is not necessary for optimization, and writing strategy parameters can be corrected in a short time. Therefore, the present invention can be applied to an apparatus and method for writing optical information.

That is, according to the optical information writing apparatus and method of the present invention, since writing strategy parameters can be determined for minimizing jitter, adjustable writing strategy parameters can be extended, and writing quality and precision can be improved. In addition, since an optimal writing strategy can be logically derived based on a single writing operation, a large area is not necessary for optimization, and writing strategy parameters can be rapidly corrected.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for writing optical information to an optical recording medium by forming a line of marks and spaces on the recording medium by generating writing pulse light according to a predetermined writing strategy and projecting the writing pulse light onto the optical recording medium, the apparatus comprising:
    a reproducing signal generation unit configured to read information from the optical recording medium according to a reference writing strategy and generate a reproducing signal according to the marks and spaces;
    a clock generation unit configured to generate a clock based on the reproducing signal;
    a detection unit configured to detect leading/trailing edge timing at leading/trailing edge positions of respective marks of the reproducing signal where the reproducing signal varies in level and corresponding variations of the clock generated by the clock generation unit;
    a calculation unit configured to calculate an element jitter and an element average position of elements classified according to combinations of lengths of the marks and the spaces based on the variations of the clock; and
    a correction unit configured to compose an evaluation function based on the element jitter, the element average position, and a writing strategy, and optimally correct the writing strategy using the evaluation function,
    wherein the correction unit corrects the reference writing strategy by using a writing strategy correction value to obtain the predetermined writing strategy.

2. The apparatus of claim 1, wherein the evaluation function is composed by adding a square of a function composed based on the element jitter and the writing strategy and a square of a function composed based on the element average position and the writing strategy, and multiplying elements of the added result by element existence probabilities, respectively.

3. The apparatus of claim 2, wherein if the element jitter is invariable with the correction of the writing strategy, the element jitter is not included in the evaluation function, and the evaluation function is composed by squaring a function composed based on the element average position and the wilting strategy and multiplying elements of the squared result by element existence probabilities, respectively.

4. The apparatus of claim 3, wherein the elements classified according to combinations of the lengths of the marks and the spaces are classified according to combinations of at least three lengths of the marks and spaces including sequential lengths.

5. The apparatus of claim 4, wherein the element jitter and the element average position of the evaluation function are expressed as a linear function of the writing strategy.

6. The apparatus of claim 5, wherein the optimal correction of the writing strategy for obtaining the predetermined writing strategy is performed by correcting the reference writing strategy using a correction value, which is obtained by differentiating a quantification part of the evaluation function according to the writing strategy with respect to the variations detected by the detection unit at the leading/trailing edge positions of the respective marks of the reproducing signal, and setting the differentiated quantification part of the evaluation function to zero.

7. The apparatus of claim 6, wherein the optimal correction of the writing strategy for obtaining the predetermined writing strategy is performed by correcting the reference writing strategy using a correction value obtained by differentiating the quantification part of the evaluation function according to the writing strategy with respect to the variations detected by the detection unit at leading/trailing edge positions of the respective marks of the reproducing signal and setting the differentiated quantification part of the evaluation function to zero, and a correction value obtained from a non-quantification part of the evaluation function by using a quasi-measurement method.

8. A method for writing optical information to an optical recording medium by forming a line of marks and spaces on the recording medium by generating writing pulse light according to a predetermined writing strategy and projecting the writing pulse light onto the optical recording medium, the method comprising:
    writing information to the optical recording medium according to a reference writing strategy by using a writing unit;
    reading the information written to the optical recording medium by the writing unit and generating a reproducing signal according to the marks and spaces by using a reproducing signal generation unit;
    generating a clock based on the reproducing signal by using a clock generation unit;
    detecting leading/trailing edge timing at leading/trailing edge positions of respective marks of the reproducing signal where the reproducing signal varies in level and corresponding variations of the clock by using a detection unit;
    calculating an element jitter and an element average position of elements classified according to combinations of lengths of the marks and the spaces based on the variations by using a calculation unit; and
    composing an evaluation function based on the element jitter, the element average position, and a writing strategy, and optimally correcting the writing strategy using the evaluation function by using a correction unit.

9. A method of writing data to an optical disk, comprising:
    writing first data that encodes a first writing strategy within first patterns on the optical disk, in response to a first writing signal;
    generating a reproducing signal in response to reading the first data from the optical disk;
    detecting variations between leading and trailing edges of the first writing signal and leading and trailing edges of the reproducing signal;
    determining a correction value using a jitter evaluation function to evaluate the detected variations;

determining a second writing strategy using the correction value to modify the first writing strategy; and writing second data that encodes the second writing strategy within second patterns on the optical disk.

10. The method of claim 9, wherein said detecting comprises determining an average leading edge position associated with a plurality of the first patterns on the optical disk; and wherein the jitter evaluation function includes the average leading edge position as a variable therein.

11. The method of claim 10, wherein each of the plurality of first patterns on the optical disk is derived from a pair of marks and a pair spaces within the first writing signal that are encoded as logic 1s and 0s.

12. The method of claim 11, wherein determining the correction value comprises differentiating the jitter evaluation function.

* * * * *